UNITED STATES PATENT OFFICE.

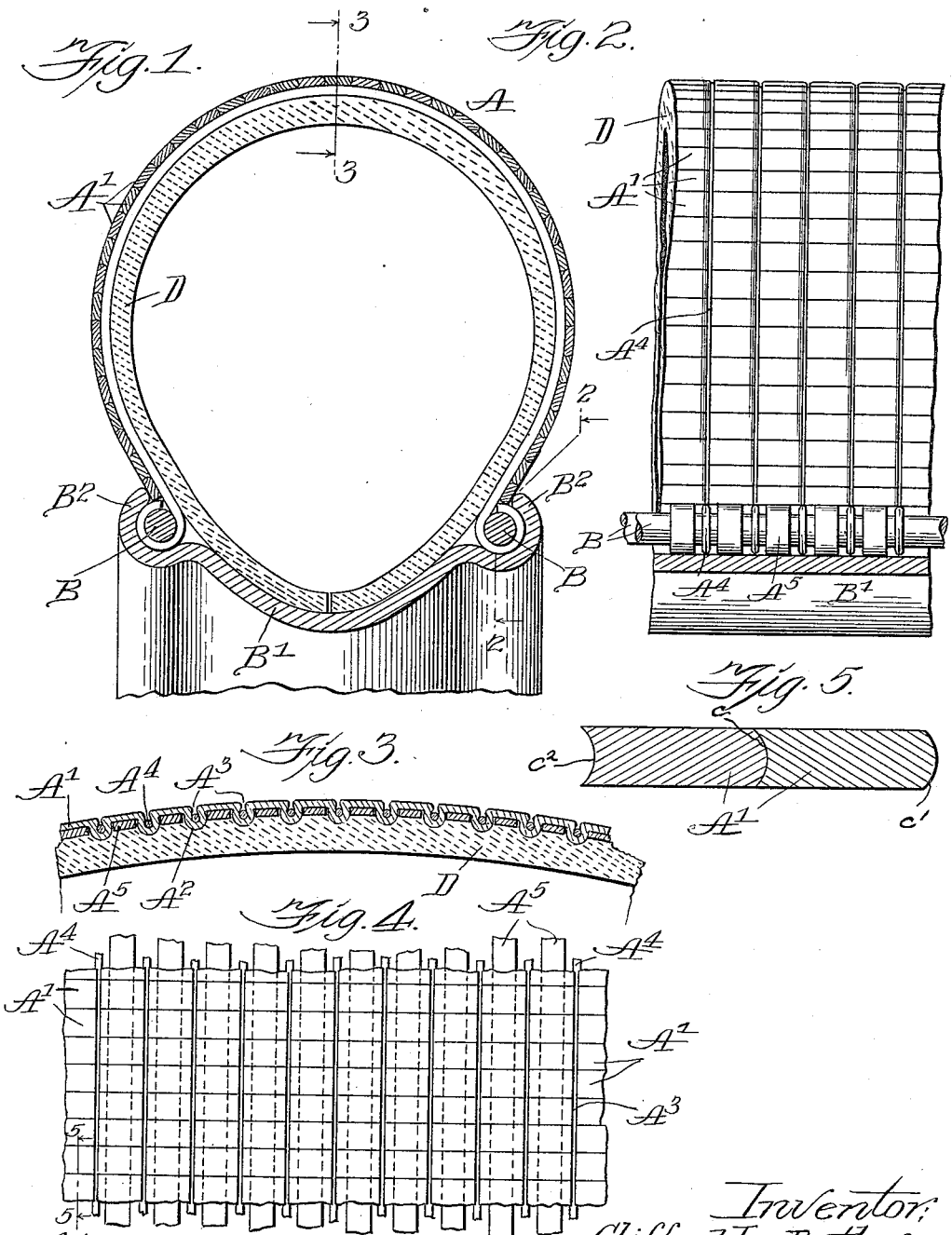

CLIFFORD L. BUTLER, OF CHICAGO, ILLINOIS, ASSIGNOR TO AMERICAN STEEL TIRE COMPANY, OF MILWAUKEE, WISCONSIN, A CORPORATION OF WISCONSIN.

AUTOMOBILE-TIRE.

1,042,392.  Specification of Letters Patent.  Patented Oct. 29, 1912.

Application filed December 29, 1910. Serial No. 599,994.

*To all whom it may concern:*

Be it known that I, CLIFFORD L. BUTLER, a citizen of the United States, residing at Chicago, in the county of Cook and State of Illinois, have invented a certain new and useful Improvement in Automobile-Tires, of which the following is a specification.

My invention relates to improvements in pneumatic tires and has for one object to provide a flexible metallic puncture-proof casing suitable for use with and protection for the usual rubber air-containing inner tube, wherein the elasticity comes, not from any unusual elasticity of the material itself but from the shape of the casing and the arrangement of the fabric.

It is illustrated diagrammatically in one form in the accompanying drawings, wherein—

Figure 1 is a section through the tire; Fig. 2 is a section on line 2—2 of Fig. 1. Fig. 3, a section along the line 3—3 of Fig. 1; Fig. 4, a detail plan view; Fig. 5, a detail section of the wires on an enlarged scale on line 5—5 of Fig. 4.

Like parts are indicated by like letters throughout the several figures.

The casing A is made up of the flat match-jointed longitudinal outer hoops $A^1$ bent to form a plurality of inwardly extending adjacent transverse lugs $A^2$ containing grooves $A^3$ in which are held the transverse binding wires $A^4$. The flat transverse inner hoops $A^5$ are located between the lugs $A^2$ and contact with the interior surfaces of the hoops $A^1$. The holding rings B are located one at either side of the casing and hold the ends of the hoops $A^4$, $A^5$, which are bent thereabout to form what might be called a selvage. The rim $B^1$ is provided at either side with the inwardly turned edges $B^2$ to engage the selvage and hold the casing in position on the rim.

The hoops $A^1$ are preferably match-jointed as shown in Fig. 5 to avoid apertures through which foreign substances may enter the casing, or through which the inner tube may be forced to cause blow-outs. As an additional precaution, however, I may provide a lining D filling in the spaces between the lugs $A^2$ and the hoops $A^4$ and presenting a flat, smooth surface to the inner tube. This lining may be made of any suitable substance but it will be evident that it may at will be dispensed with without in any way changing the operation of my casing.

It will be evident that although I have shown in my drawings an operative device, still many changes might be made in the size, shape and arrangement of the parts, without departing materially from the spirit of my invention.

I claim:

1. A flexible metallic tire comprising a plurality of parallel longitudinal members in contact with each other at all points and a plurality of lugs inwardly extending from each of said members, slots in said lugs and transverse binding members therein.

2. A flexible metallic tire comprising a plurality of parallel longitudinal members in contact with each other at all points and a plurality of lugs inwardly extending from each of said members, slots in said lugs and in communication with the outside of the casing and binding members in said slots.

3. A flexible metallic tire comprising a plurality of parallel longitudinal members in contact with each other at all points and a plurality of lugs inwardly extending from each of said members, slots in said lugs and in communication with the outside of the casing and binding members between said adjacent lugs.

4. A flexible metallic tire comprising a plurality of parallel longitudinal members in contact with each other at all points and transverse binding members in engagement with said longitudinal members and rigid parallel annular members on either side of the casing and rigidly holding the ends of said binding members.

5. A flexible metallic tire comprising a plurality of parallel longitudinal members said members match-jointed one with the other and transverse binding members in engagement with said longitudinal members and a plurality of rigid parallel annular members on either side of the casing and rigidly holding the ends of said binding members.

6. A flexible metallic tire comprising a plurality of parallel longitudinal members in contact with each other at all points and transverse binding members in engagement with and some of them above and some of them below said longitudinal members and all of them below the bearing surface of the tire.

7. A flexible metallic tire casing comprising a series of metallic tread-forming hoops, a series of transverse binding wires thereabout and means for holding them all together to form a tube like casing for the inner tube.

8. A flexible metallic tire casing comprising a series of exterior metallic tread-forming hoops, each transversely grooved on its outer side, and a series of transverse encircling binding wires let into said grooves and means for binding the whole together so as to form a tube like casing for the inner tube.

9. A flexible metallic tire casing comprising a series of exterior metallic tread-forming hoops, a series of inner transverse hoops adjacent to said tread-forming hoops, and a series of transverse binding wires about the exterior hoops and means for holding them all together so as to form a tube like casing for the inner tube.

10. A flexible metallic tire casing comprising a series of exterior metallic tread-forming hoops with transverse inwardly projecting grooved lugs, a series of inner transverse hoops between the lugs, a series of transverse encircling binding wires in the grooves, and means for holding the whole together so as to form a tube like casing for the inner tube.

11. A flexible metallic tire casing comprising a series of narrow closely contacting exterior tread-forming match-jointed metallic hoops, transverse encircling binding wires to hold them in position and means for holding all the parts together to form a casing for the inner tube.

CLIFFORD L. BUTLER.

Witnesses:
FRANCIS W. PARKER, Jr.,
P. J. GATHMANN.

---

Copies of this patent may be obtained for five cents each, by addressing the "Commissioner of Patents, Washington, D. C."